(12) United States Patent
Loewen et al.

(10) Patent No.: US 10,971,275 B2
(45) Date of Patent: Apr. 6, 2021

(54) PASSIVE ELECTRICAL COMPONENT FOR SAFETY SYSTEM SHUTDOWN USING AMPERE'S LAW

(71) Applicant: GE-Hitachi Nuclear Energy Americas LLC, Wilmington, NC (US)

(72) Inventors: Eric Paul Loewen, Wilmington, NC (US); David W. Webber, Wilmington, NC (US); Seth Ryan Paul Strege, Wilmington, NC (US); Maria E. Pfeffer, Wilmington, NC (US); Scott L. Pfeffer, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 249 days.

(21) Appl. No.: 16/176,687

(22) Filed: Oct. 31, 2018

(65) Prior Publication Data
US 2020/0135352 A1 Apr. 30, 2020

(51) Int. Cl.
*G21D 1/02* (2006.01)
*G21D 3/04* (2006.01)
*G21D 3/08* (2006.01)

(52) U.S. Cl.
CPC .............. *G21D 1/02* (2013.01); *G21D 3/04* (2013.01); *G21D 3/08* (2013.01)

(58) Field of Classification Search
CPC .. G21D 1/02; G21D 3/04; G21D 3/08; H02H 3/08; H02H 3/05
See application file for complete search history.

(56) References Cited

U.S. PATENT DOCUMENTS

| 3,115,450 A | 12/1963 | Schanz |
| 3,660,231 A | 5/1972 | Fox et al. |
| 3,700,970 A * | 10/1972 | Miyoshi ................ H01H 9/106 361/115 |
| 3,708,723 A | 1/1973 | Shand et al. |

(Continued)

FOREIGN PATENT DOCUMENTS

KR 101261496 B1 5/2013

OTHER PUBLICATIONS

"DCIS Integration Tests for Lungmen Nuclear Power Plant"; Jiin-Ming Lin and Jeen-Yee Lee; Department of Nuclear Engineering, Taiwan Power Compoany; NPIC&HMIT 2017; Jun. 11-15, 2017; pp. 1962-1971.

(Continued)

*Primary Examiner* — Dominic E Hawkins
(74) *Attorney, Agent, or Firm* — Harness, Dickey & Pierce, P.L.C.

(57) ABSTRACT

An electro-technical device includes a circuit including a coil connected to a voltage source for receiving a predetermined current therefrom and connected to an output device. The circuit includes a breakable junction and a photodiode for receiving a light signal from a fiber optic cable. The photodiode receives a light signal from a sensor. A permanent magnet includes a pole end opposing a common pole end of the coil, wherein when the coil receives an increased current from the photodiode, the coil creates an magnetic flux that repels against the common pole of the permanent magnet in order to cause the breakable junction to break and disrupt a connection between the voltage source and the output device.

9 Claims, 2 Drawing Sheets

(56) References Cited

U.S. PATENT DOCUMENTS

| | | | | |
|---|---|---|---|---|
| 4,320,433 | A | * 3/1982 | Yamaki | H02H 3/332 |
| | | | | 324/117 R |
| 4,949,362 | A | 8/1990 | Gaubatz | |
| 4,957,690 | A | 9/1990 | Fennern | |
| 5,978,191 | A | * 11/1999 | Bonniau | H02H 3/335 |
| | | | | 361/45 |
| 7,614,233 | B2 | 11/2009 | Chaki et al. | |
| 2007/0282164 | A1 | * 12/2007 | Frisch | A61B 1/041 |
| | | | | 600/109 |
| 2014/0055899 | A1 | * 2/2014 | Gruber | H02H 9/025 |
| | | | | 361/91.6 |

OTHER PUBLICATIONS

International Search Report and Written Opinion dated Feb. 7, 2020 (corresponding to PCT/US2019/058521).

* cited by examiner

PASSIVE ELECTRICAL COMPONENT FOR SAFETY SYSTEM SHUTDOWN USING AMPERE'S LAW

BACKGROUND

Field

The present disclosure relates to a safety system shutdown including a passive electrical component that senses a system parameter and becomes tripped if a predetermined set point is reached so that a signal is sent to take an action in the system. The passive electrical component makes use of the principles of Ampere's Law.

Description of Related Art

This section provides background information related to the present disclosure which is not necessarily prior art.

Modern nuclear reactors use a variety of digital systems for both control and safety, referred to as a Distributed Control and Information System (DCIS). These systems must be redundant, diverse, fault tolerant, and have extensive self-diagnosis while the system is in operation. Meanwhile, the nuclear digital industry is concerned with common cause software failure. Even more damaging is a cyberattack to, or through, the system safety systems. In the digital industry, the desire to increase computational power while decreasing component size results in a very small digital device with embedded software. It is very difficult to convince a regulatory body that these systems cannot have a common cause failure. Even more damaging operations can occur when this compact digital system is subjected to a cyberattack. These extreme unknown conditions of a nuclear power plant safety system lead to the cause for redundancy, independence, and determinacy, all of which contribute to significant added cost.

FIG. 3 schematically shows a conventional distributed control and information system (DCIS) 200 with both a safety portion 202 and non-safety portion 204 that are interfaced by a control panel 203. The present disclosure is directed to the safety portion 202 of the DCIS 200 which is shown in FIG. 3. The safety portion 202 of the DCIS 200 includes four independently designed divisions 202A-202D which each receive measured system signals that are collected and sent from a remote multiplexer unit RMU 205 which provides output to the digital trip module DTM 206 which each provide outputs to the trip logic units TLU 208 which each provide an output signal to the output logic unit OLU 210. The conventional safety portions 202 use a voting logic of at least two out of four of the different divisions 202A-202d receiving like signals in order to determine a fault (i.e. pressures and temperatures are not compared against each other). It becomes more difficult for the nuclear power plant control system designer, purchaser, installer, and operator to establish and trace the essential safety signals to ensure the system is performing as designed. A device and method is needed on a scale that humans can vary "signal flow" or trace the flow of electrons/data so that the system is immune from cyber-attack.

SUMMARY

This section provides a general summary of the disclosure, and is not a comprehensive disclosure of its full scope or all of its features.

The present disclosure provides electro-technical devices that, coupled to control systems, can provide passive system safety shutdown using Ampere's Law. These devices will solve the issue of common cause software failure or cyber security attacks that are inherent limitations of digital safety systems. The Ampere's law contactor provides an electro-technical device that can be set up in multiple configurations to protect a nuclear power plant, or another sensitive infrastructure. The electro-technical devices of the present disclosure can be produced in part using metallic and plastic 3-D printing machines that can be utilized to ensure consistent manufacture of the electro-technical device for which the manufacturing data can be captured and stored for utilization in confirming the device's consistent operational characteristics. The devices use a simple pass/fail or go/no-go check to convey to an electrical safety system to change state to safe shutdown. The printed device is placed into the safety system to perform three basic tasks: senses a system parameter (e.g. temperature, flow, pressure, power or rate of change), if the predetermined set point is reached—result in a "tripped" state, and lastly, if the safety system logic is met-send a signal or activate a device to take an action in the system, such as shutdown. The device also eliminates failures due to software or digital cyber-attacks.

An electro-technical device includes a circuit including a coil connected to a voltage source for receiving a predetermined current therefrom and connected to an output device. The circuit includes a breakable junction and a photodiode for receiving a light signal from a fiber optic cable. The photodiode receives a light signal from a sensor. A permanent magnet includes a pole end opposing a common pole end of the coil, wherein when the coil receives an increased current from the photodiode, the coil creates a magnetic flux that repels against the common pole of the permanent magnet in order to cause the breakable junction to break and disrupt a connection between the voltage source and the output device.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
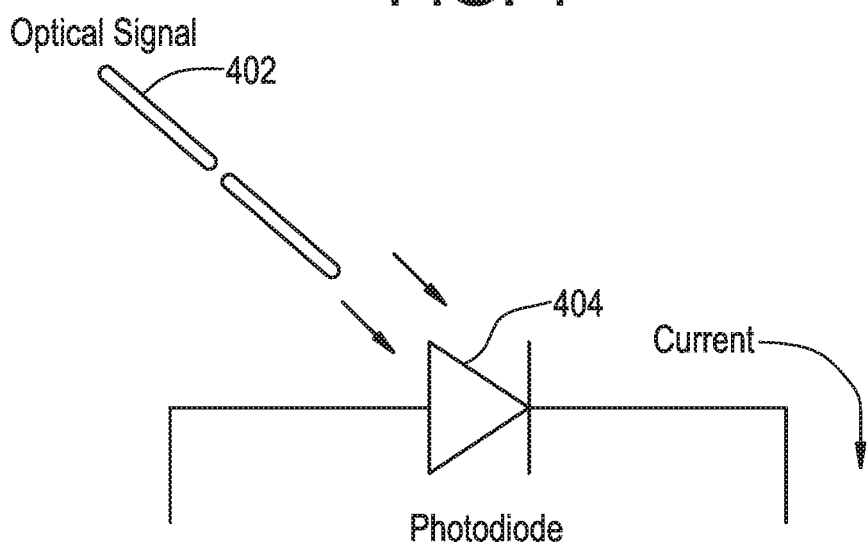
FIG. 1 is a schematic view of a photodiode.

FIG. 1 is an illustration of photodiode 404 to illustrate how the curl of the magnetic fields can be used to detect a time changing electric flux density. As shown in FIG. 1, an optical signal 402 is being picked up by the photodiode 404 which is an electromagnetic wave that is composed of electric and magnetic fields that oscillate perpendicularly to the direction of the light wave. The photons from the signal are absorbed into the semiconducting materials of the photodiode 404, which results in a generated current. The amount of current generated is proportional to the amount of light entering the photodiode 404. Ampere's law describes that the magnetic field around an electric current is proportional to the electric current providing the source for the field. Additionally it also describes that a variation in an electric field over time can generate a magnetic field. The current flowing within the photodiode 404 after photon absorption follows this law. The current, and subsequent magnetic field, can be measured and then communicated throughout the entire system.

Figure 2:
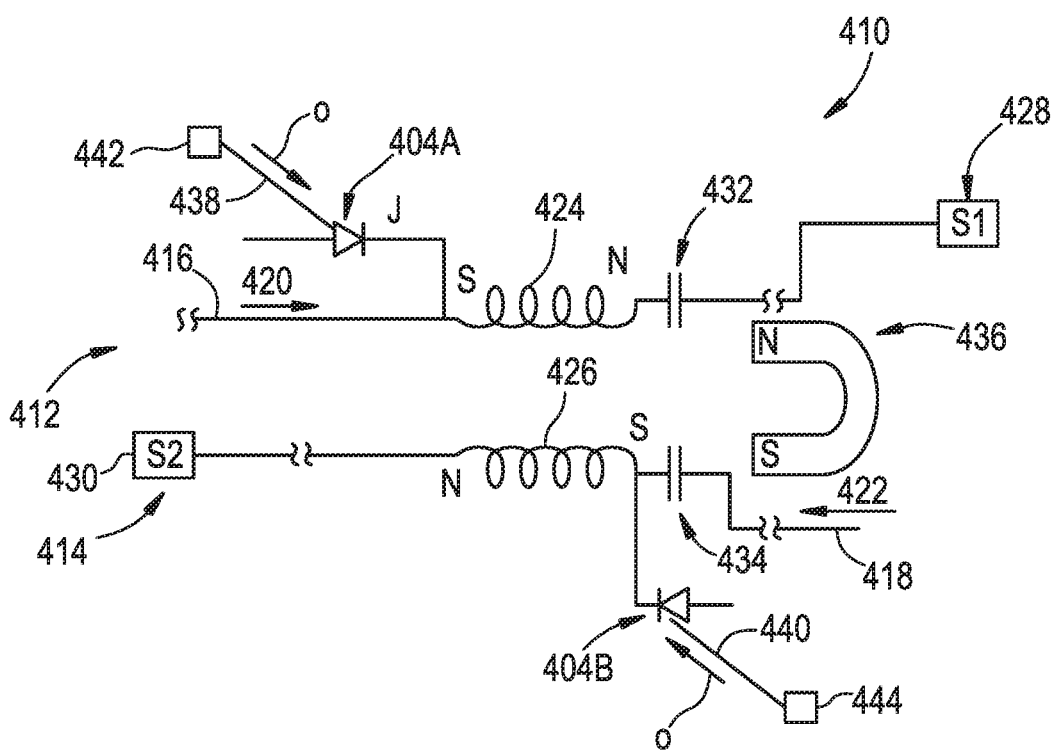
FIG. 2 is a schematic view of a safety system employing an Ampere's Law contactor according to the principles of the present disclosure.

As shown in FIG. 2, the Ampere's law logic contactor 410 is utilized in a nuclear safety system to produce a logic device without software when a system trip condition exists. As shown in FIG. 2, the Ampere's law logic contactor 410 includes a pair of circuits 412, 414 each including a respective input connector 416, 418 which are each provided with input signals 420, 422. The input connectors 416, 418 are connected to respective coils 424, 426 which are each connected to respective system solenoids 428, 430 via a breakable/disconnectable junction 432, 434. A pair of photo diodes 404A, 404B are connected to the pair of circuits 412, 414 to provide additional current to the circuits 412, 414. The coil 424 is arranged so that a magnetic field generated by current flow has a north pole at a downstream side of the coil 424 relative to the current flow direction while the coil 426 is arranged so that a magnetic field generated by current flow has a south pole at a upstream side of the coil 426 relative to the current flow direction. A permanent magnet 436 is provided with a north pole "N" opposing the north pole side of the coil 424 and a south pole "S" of the permanent magnet 436 opposing the south pole side of the coil 426.

The photodiodes 404A, 404B are each provided with photo-optic signals from fiber optic lines 438, 440 that provide signals representative of a sensor 442, 444 that senses one of temperature, pressure, flow or another parameter which is relevant to a system safety factor for indicating a need for a shutdown.

Figure 3:
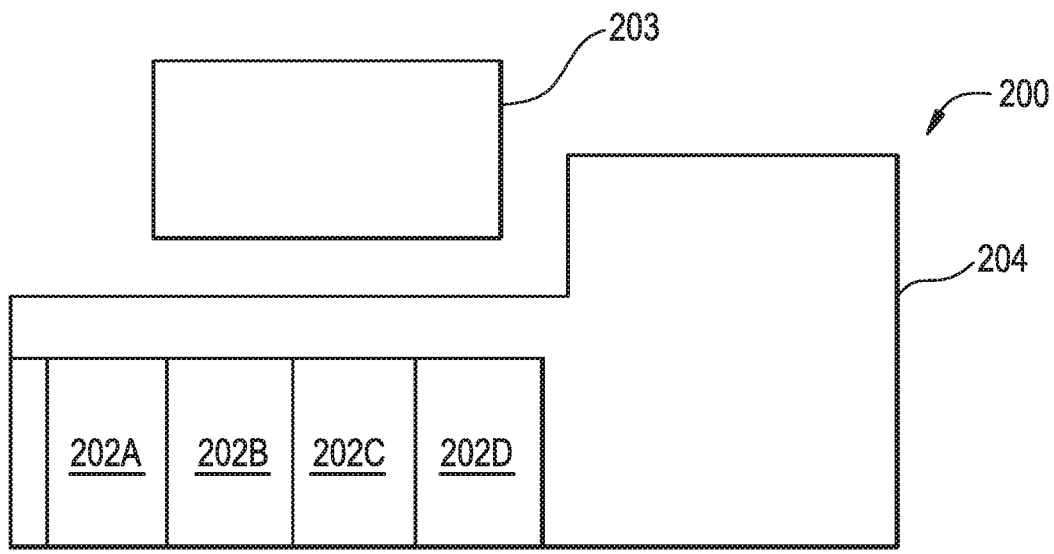
FIG. 3 is a schematic view of a conventional digital system of a distributed control and information system for a nuclear reactor.
Figure 4:
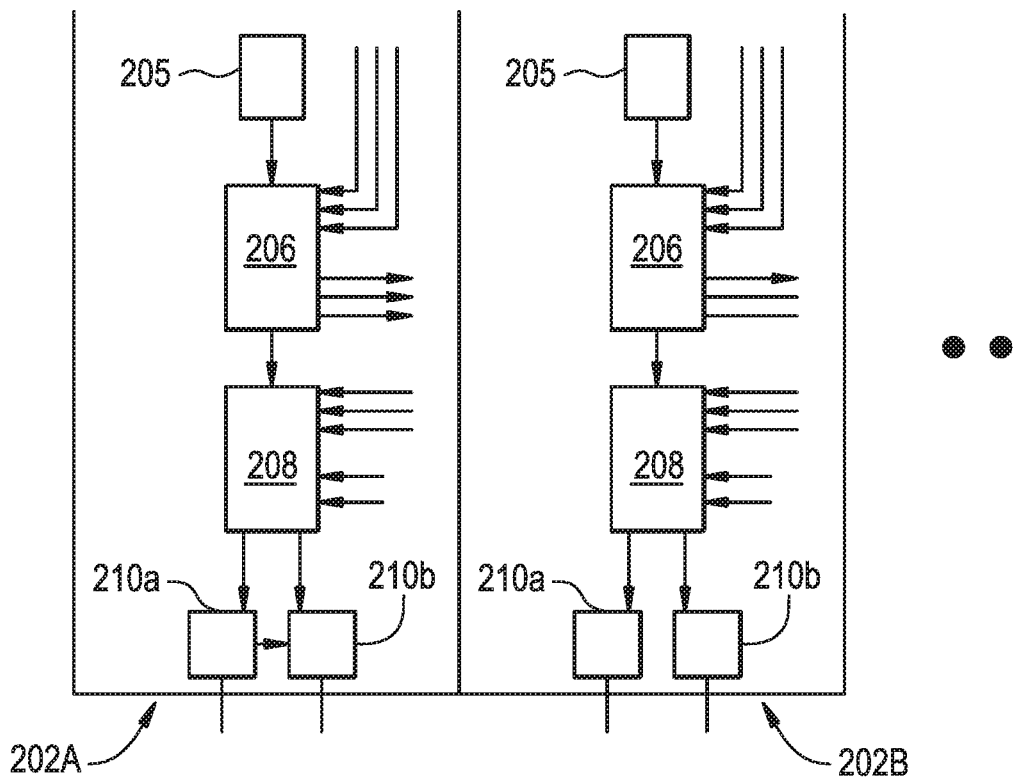
FIG. 4 is a schematic view of a safety portion of the conventional digital system of a distributed control and information system as shown in FIG. 3.

The photodiodes 404A, 404B convert the optical signal "O" from the fiber optic lines 438, 440 into a current density J that provides more current into the coils 424,426. The coils 424, 426 are in balance with the permanent magnet 436 such that there is a balance force at the breakable junctions 432, 434. As illustrated in FIG. 2, the right portion of the breakable junctions 432, 434 are anchored and the left portion of the junctions are attached to movable coils 424, 426. When an optical trip signal from sensors 442, 444 is received due to the light wave O and is converted by the photodiodes 404A, 404B into an electrical current J this causes a divergence change in the magnetic field H of the coils 424, 426. This imbalance causes the coils 424, 426 and the magnetic field of the permanent magnet 436 to oppose each other resulting in a separation at one or both of the breakable junctions 432, 434. This stops current flow to the solenoid connections 428,430 resulting in a safety system action. The amount of current generated is proportional to the amount of light O hitting the photodiodes 404A, 404B which is proportional to the divergence in the magnetic field and the imbalance to the permanent magnetic field 436. Accordingly, the Ampere's law contactor 410 can be utilized in a nuclear safety system as previously described and can replace the DTM, TLU and OLU previously described in FIGS. 3 and 4.

During steady-state, operation of the Ampere's Law contactor receives input from the photodiodes 404A, 404B. If the photon level exceeds the device baseline, the safety system response is actuated. The breakable junctions 432, 434 of the device respond as a once-in-a-lifetime component activation, such as a fuse.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electro-technical device, comprising:
a circuit including a coil connected to a voltage source for receiving a current therefrom and connected to an output device;
the circuit including a breakable junction;
the circuit including a photodiode for receiving a light signal from a fiber optic cable receiving a light signal from a sensor; and
a permanent magnet having a pole end opposing a common pole end of the coil, wherein when the coil receives an increased current from the photodiode, the coil creates an magnetic flux that repels against the common pole of the permanent magnet in order to cause the breakable junction to break and disrupt a connection between the voltage source and the output device.

2. The electro-technical device according to claim 1, wherein the breakable junction is disposed between the permanent magnet and the coil.

3. The electro-technical device according to claim 1, wherein the breakable junction is made by 3-D printing.

4. The electro-technical device according to claim 1, wherein the sensor includes one of a temperature sensor, a pressure sensor, or a flow sensor.

5. An electro-technical device, comprising:
   a plurality of circuits each including a coil connected to a voltage source for receiving a current therefrom and connected to an output device;
   each of the plurality of circuits including a breakable junction;
   each of the plurality of circuits including a photodiode for receiving a light signal from a fiber optic cable receiving a light signal from a sensor; and
   each of the coils of the plurality of circuits having a pole end opposing a common pole end of one or more permanent magnets, wherein when the coils receive an increased current from the respective photodiode, the coils create a magnetic flux that repels against the common pole of the permanent magnet in order to cause the breakable junction to break and disrupt a connection between the voltage source and the output device.

6. The electro-technical device according to claim 5, wherein the breakable junction of each of the plurality of circuits are disposed between the permanent magnet and the coil.

7. The electro-technical device according to claim 5, wherein the breakable junction of each of the plurality of circuits are made by 3-D printing.

8. The electro-technical device according to claim 5, wherein the sensor of each of the plurality of circuits includes one of a temperature sensor, a pressure sensor, or a flow sensor.

9. A method of making an electro-technical device, comprising:
   connecting a circuit between a voltage source for receiving a current therefrom and connected to an output device;
   the circuit including a breakable junction that is 3-D printed;
   the circuit including a photodiode for receiving a light signal from a fiber optic cable receiving a light signal from a sensor; and
   mounting a permanent magnet having a pole end opposing a common pole end of the coil, wherein when the coil receives an increased current from the photodiode, the coil creates an magnetic flux that repels against the common pole of the permanent magnet in order to cause the breakable junction to break and disrupt a connection between the voltage source and the output device.

\* \* \* \* \*